Jan. 9, 1962
A. J. ZALEWSKI
3,016,202
IRRIGATING DEVICE
Filed Jan. 13, 1960
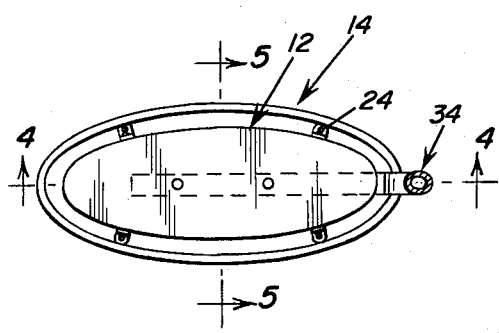
Fig. 1
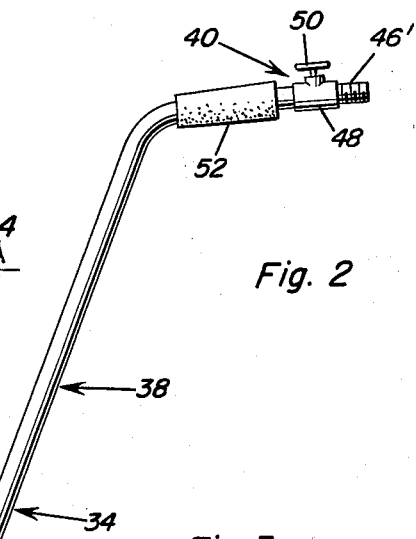
Fig. 2
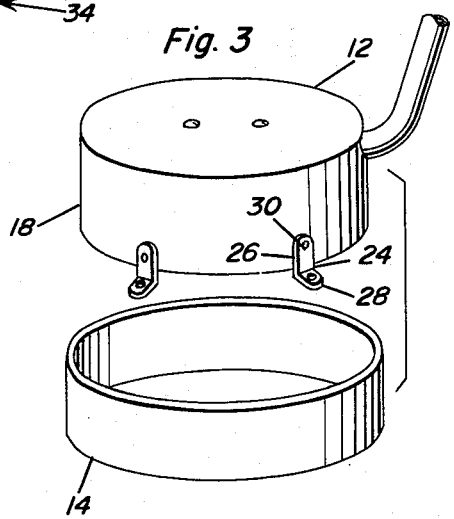
Fig. 3
Fig. 5
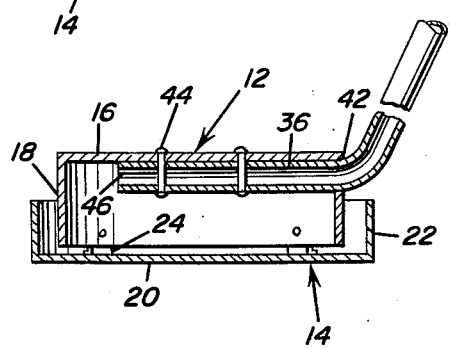
Fig. 4
Anton J. Zalewski
INVENTOR.

3,016,202
IRRIGATING DEVICE
Anton J. Zalewski, 5319 S. 43rd St., Milwaukee, Wis.
Filed Jan. 13, 1960, Ser. No. 2,304
3 Claims. (Cl. 239—542)

This invention relates generally to irrigating equipment and more particularly to a relatively simple and novel construction for distributing water to the land.

Many irrigating and sprinkling devices are illustrated in the prior art for watering lawns and crops. Most of these devices have often proved to be inadequate for any of several reasons. Several types are difficult to utilize and move about over the lawns or crops. Further, several of the types cause the water to fall on the land with too great a force and accordingly wash away the soil in places. Others cause undesirable spraying, splashing, and sprinkling.

In view of the undesirable features above pointed out, it is the principal object of this invention to provide a simple and novel irrigating device construction which distributes water to the land in mild and consistent flow so as to prevent any adverse effects thereon.

More specifically, it is an object of this invention to provide a novel irrigating device which may be readily moved through the rows of plants for consistently and properly distributing water. The irrigating device disclosed is free of any corners or sharp edges and accordingly cannot damage the plants as it moves by.

It is a further object of this invention to provide a novel irrigating device which enables an area to be more quickly irrigated thereby saving considerable time and expense.

It is still a further object of this invention to provide a novel irrigating device construction which may be assembled and disassembled with a minimum of effort and which may be manufactured and utilized at a low expense. Further, inasmuch as no moving parts are employed, the device is relatively trouble free requiring no maintenance costs.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is an elevational plan view of the invention illustrating the handle thereof in section;

FIGURE 2 is a perspective view illustrating the irrigating device and showing how the tubular member or handle extends upwardly externally of the container;

FIGURE 3 is a perspective disassembled view illustrating how the bottom container receives the top container therein;

FIGURE 4 is a sectional view taken substantially along the plane 4—4 of FIGURE 1; and FIGURE 5 is a sectional view taken substantially along the plane 5—5 of FIGURE 1.

Attention is now called to the accompanying drawings. It is to initially be appreciated that the device may be made of any size deemed desirable and may be constructed of any of several rustproof materials such as aluminum or plastic. It is, of course, preferable that the device be light in construction so as to facilitate handling thereof.

The irrigating device 10 includes primarily a top container or baffle 12 and a bottom container or pan 14. The top container 12 is provided with a top closure plate 16 having a continuous depending wall 18 secured thereto, said container being essentially inverted cup-shaped. The bottom container 14 includes a bottom closure plate 20 and a continuous upstanding wall 22 secured thereto.

Each of the containers 12 and 14 is oval in shape as indicated in FIGURE 1 with the top container 12 being smaller than the bottom container 14.

Depending legs 24 are secured to the depending continuous wall 18. The legs 24 include a vertical portion 26 and a foot portion 28 extending perpendicularly thereto. A rivet or such 30 secures the vertical portion 26 to the depending wall 18 while the foot portion 28 rests on the bottom closure plate 20 as is particularly illustrated in FIGURES 4 and 5. A rivet 32 may be utilized to secure the foot portion 28 to the bottom closure plate 20. It is to be noted however that the depending wall 18 is spaced from the bottom closure plate 20. Several legs 24 are secured to the top container 12 and support the top container 12 at various points. Attention is called to FIGURE 1 wherein it is noted that at least four legs 24 are provided. It will be appreciated that the spacing between the legs 24 provides communication between the inside of container 12 and inside of container 14.

A tubular member or water supply pipe 34 is provided with a horizontal lower end portion 36 and an upwardly and obliquely extending intermediate portion 38. A second horizontal portion 40 is provided at the upper and outer end of the tubular member 34. An aperture 42 is defined in the wall 18 and the tubular member 34 extends therethrough. Rivets 44 are provided for securing the horizontal portion 36 of the tubular member 34 to the top closure plate 16.

The tubular member 34 is provided with an open end 46 which is opposed to the depending wall 18 as is best illustrated in FIGURE 4. The upper terminal portion of the tubular member 34 is threaded as at 46' and is adapted to receive a connector element thereon supported by a conventional flexible hose. Valve means 48 including a manual actuator 50 is provided on the tubular member 34 for controlling flow through the tubular member. A frictional grip member 52 is fitted on the tubular member 34 at the horizontal portion 40 for facilitating grip on the tubular member 34.

In use, a hose (not shown) will feed liquid as water through the tubular member 34 and out the open end 46 of the tubular member. The water will initially engage the depending wall 18 but will, in fact, rise within the bottom container 14. When sufficient liquid passes through the tubular member 34, the liquid will flow over the upstanding wall 22 so as to irrigate the ground beneath the bottom closure plate 20. It will therefore be apparent that the liquid is neither being sprayed nor sprinkled nor splashed on the ground but is rather merely consistently flowing on to the ground. Accordingly, the ground will in no way be adversely affected.

Due to the particular shape of the invention, the irrigating device may be motivated between the rows of plants by merely pushing forward on the tubular member 34 gripping the frictional grip 52. The bottom closure plate 20 is flat and no sharp edges are defined on the device for snagging on plants, roots, or rocks. Accordingly, the device may be easily and efficiently motivated along the ground as desired with the liquid flow consistently and properly moistening the soil. Of course, it will be appreciated that the valve means 48 may be utilized as desired for increasing or decreasing the flow of liquid through the tubular member 34.

If desired, the rivets hereinbefore referred to may be replaced by screws so as to facilitate the assembly and disassembly of the device. It will be further appreciated that the tubular member 34 should preferably extend in line with the longer axis of the oval-shaped containers.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A soil irrigator comprising a pan adapted to rest on the ground, a generally inverted cup-shaped baffle mounted in said pan in spaced relation to the walls and bottom thereof, means fixedly securing the baffle in the pan, and means for discharging water into the baffle, the last-named means including a supply pipe extending into the baffle through a side wall portion thereof and terminating in an open discharge end opposed and adjacent to but spaced from an opposite wall portion thereof, said pipe including an upwardly inclined intermediate portion terminating in an angularly extending upper end portion including a grip and providing a carrying handle.

2. A soil irrigator comprising a shallow oval pan adapted to rest on the ground and including a flat bottom, an oval, essentially inverted cup-shaped baffle mounted in the pan and secured to the bottom thereof in vertically spaced relation thereto, said baffle including a flat top and vertical walls, and a water supply pipe having one end portion extending into the baffle through one end thereof and secured beneath said top thereof, said pipe having an open discharge end opposed and adjacent to but spaced from the other end of the baffle, said pan including vertical walls telescopically receiving said vertical baffle walls in outwardly spaced relation thereto, said pipe including an upwardly inclined intermediate portion terminating in an angularly extending upper end portion including a grip and providing a carrying handle.

3. A soil irrigator comprising a shallow oval pan adapted to rest on the ground and including a flat bottom, an oval, essentially inverted cup-shaped baffle mounted in the pan and secured to the bottom thereof in vertically spaced relation thereto, said baffle including a flat top and vertical walls, and a water supply pipe having one end portion extending into the baffle through one end thereof and secured beneath said top thereof, said pipe having an open discharge end opposed and adjacent to but spaced from the other end of the baffle, said pipe including an upwardly inclined intermediate portion terminating in an angularly extending upper end portion including a grip and providing a carrying handle, said pan including vertical walls telescopically receiving said vertical baffle walls in outwardly spaced relation thereto.

References Cited in the file of this patent
UNITED STATES PATENTS

| | | |
|---|---|---|
| 1,877,388 | Coelho | Sept. 13, 1932 |
| 1,883,656 | Estock | Oct. 18, 1932 |
| 1,949,904 | Guedel | Mar. 6, 1934 |
| 2,037,145 | Palermo | Apr. 14, 1936 |
| 2,213,955 | Freitas | Sept. 10, 1940 |
| 2,324,234 | Peters | July 13, 1943 |
| 2,785,010 | Nelson | Mar. 12, 1957 |

FOREIGN PATENTS

| | | |
|---|---|---|
| 885,680 | Germany | Aug. 6, 1953 |